No. 814,624. PATENTED MAR. 6, 1906.
D. E. ROBINSON.
FISH HOOK.
APPLICATION FILED MAR. 6, 1905.

Witnesses:
C. D. Kesler
J. B. Keefe

Inventor
Daniel E. Robinson
By James L. Norris
Atty.

UNITED STATES PATENT OFFICE.

DANIEL E. ROBINSON, OF OTEGO, NEW YORK.

FISH-HOOK.

No. 814,624.  Specification of Letters Patent.  Patented March 6, 1906.

Application filed March 6, 1905. Serial No. 248,615.

*To all whom it may concern:*

Be it known that I, DANIEL E. ROBINSON, a citizen of the United States, residing at Otego, in the county of Otsego and State of New York, have invented new and useful Improvements in Fish-Hooks, of which the following is a specification.

This invention relates to resilient fish-hooks of the duplex type having reversely-projecting outwardly-directed hook-terminals shaped and barbed similarly to ordinary fish-hooks and operating when a strike is made to securely and reliably engage opposite portions of the mouth of the fish and preliminarily covered or hidden by the bait.

The present form of hook is constructed from a single piece of spring-wire of suitable gage, and it will be modified proportionately to the dimensions of the hook and is so shaped as to provide two depending hook-shanks, each one set interlocked by a readily-separable projection integrally formed with one of the shanks and coöperating with the remaining shank, the latter adjacent to the hook-terminals being shaped or struck out in reverse directions to position the said terminals in spaced relation. The hook-terminals are laterally projected and inclined in reverse directions to render such terminals more effective in attaching the fish when a strike is made and defeat disengaging attempts on the part of the hooked fish.

Figure 1:
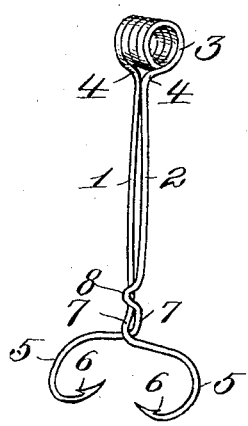
Figure 3:
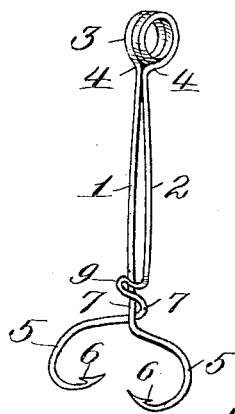
Figure 5:
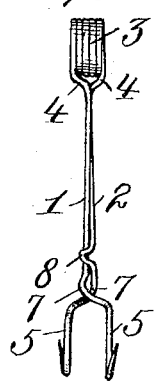
Figure 2:
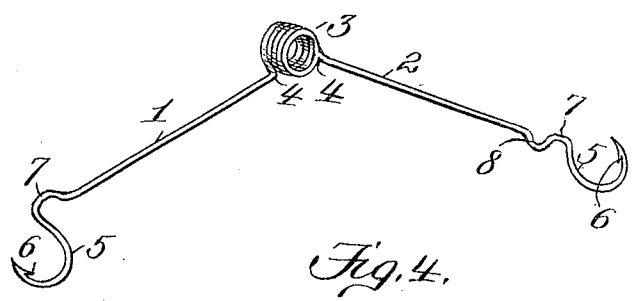
Figure 6:
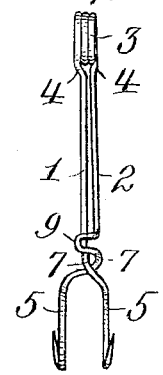
Figure 4:
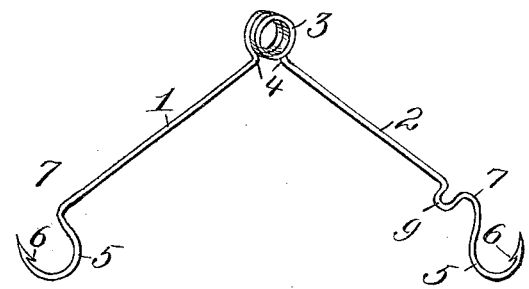

In the drawings, Figure 1 is a perspective view of a hook embodying the features of the invention and shown closed. Fig. 2 is a similar view of the hook shown open. Fig. 3 is a perspective view of a slightly-modified form of the hook in closed condition. Fig. 4 is a detail perspective view of the modified form of the hook shown open. Figs. 5 and 6 are elevations of the two forms of hooks shown closed.

Similar numerals of reference indicate corresponding parts in the different views.

The numerals 1 and 2 designate shanks, which continue from terminal coils of an intermediate connecting spring-coil 3, primarily formed at the center of a suitable length of resilient or spring wire, both shanks at the point where they leave the terminal coils of the said spring-coil 3 being struck inwardly, as at 4, to facilitate a close assemblage and efficient operation of the shanks and hook-terminals 5, forming a part thereof and also continuous therewith. The hook-terminals 5 are projected outwardly in reverse positions, and the barbed extremities 6 thereof are also deflected at reverse inclinations. This deflection of the barbed extremities 6 of the hook-terminals 5 facilitates the securement of the hook-terminals in the mouth of a fish when a strike is made and also gives a better clearance for the application of the bait and a retention of the said hook-terminals in close association when the hook is set in a manner which will be hereinafter more particularly referred to.

The parts of the hook thus far described are features common to both forms, and similar reference-numerals are employed to designate corresponding structural features.

In the form of the device shown by Figs. 1 and 2 the shanks 1 and 2 adjacent to the points where the hook-terminals 5 project therefrom are constructed with reversely-bent seats 7 to permit said portions of the shanks to closely interlock and bring the hook-terminals 5 in proper juxtaposition. When the shanks 1 and 2 are drawn together, a locking bend or projection 8, formed with one of the shanks, is caused to engage the outer portion of the opposite shank, as shown by Fig. 1, and when the shanks are in this relation and the hook-terminals closely disposed the bait is applied and acts as a further means to prevent an accidental disengagement of the interlocked shanks and separation of the terminals.

In the form of the device shown by Figs. 3 and 4 the seats 7 are employed, and in addition a locking bend or projection 9 is formed in one of the shanks and is curved rearwardly to embrace the opposite shank with sufficient stress to prevent accidental disengagement of the two shanks, especially when the bait is applied to the hook-terminals.

After the hook-terminals in either form of the device illustrated are assembled or drawn into close relation and the bait applied they will not become separated until a strike is made and the bait disengaged or pulled from the hook-terminals, and when such operation ensues the hook-terminals become disengaged by the pressure exerted thereon, and a release of the one shank from the locking bend or projection of the opposite shank ensues and permits the spring-coil 3 to come into play and throw both shanks and the hook-terminals thereof in an outward direction. When this latter movement of the shanks and hook-terminals takes place, the barbed extremities 6 of the said terminals are forced into the upper and lower portions of the mouth of the fish, and by reason of the lateral deflection or reverse inclination of said barbed extremities it will be impossible for the fish hooked to be lost or become disengaged from the improved device. The bends 8 and 9 have such position with respect to the shanks of which they form a part that they will extend across and lock the two shanks when the latter are in close relation, as shown by Figs. 1 and 3, the said bends 8 and 9 having such angle that they will be effective in performing their intended function. When the shanks 1 and 2 are drawn together and the one hook-terminal is extended past and over the other, the bends 8 and 9 prevent the shanks and their hook-terminals from flying apart in view of the fact that the said shanks and hook-terminals are drawn inwardly toward each other in reverse directions, the locking effect of the bends 8 and 9 being sufficient to hold the hook-terminals 5 in close assemblage, but do not have an extent or locking resistance of such nature as to in any wise interfere with the sensitive release operation of the hook-terminals when the bait is struck by a fish. The bends 7 of the form of the device shown by Figs. 1 and 2 are more pronounced or deeper than the bends 7 illustrated by Figs. 3 and 4, the latter bends being curved regularly or continued from the hook-terminals.

Another material advantage in this form of hook is that when set and baited it cannot be released by a fish nibbling or pulling at the end of the bait, nor will it be possible for the bait to be lost or wasted, as the greater portion thereof is between or securely held by the hook-terminals, and in order to obtain the same it is necessary for a fish to make a full strike. Moreover, by the spaced relation of the hook-terminals and the outward inclination of the barbed extremities thereof a material saving in bait results, and the latter is protected and cannot be torn or killed, especially in view of the fact that the hook-terminals do not touch each other. The hook can be readily set at night without the use of a light and the hook-terminals in operation or after a strike is made cannot fly out of the corners of the mouth of the fish, as quite frequently occurs in other spring-hook constructions, in view of the deflection of the barbed extremities hereinbefore set forth. The resistance to the hook-terminals flying out of the corners of the mouth of the fish after the strike is made will result in an engagement of the flesh of the fish both in the upper and under jaws. The improved hook cannot readily become snagged, as the deflections of the barbed extremities project inwardly instead of outwardly when the fish-hook is set. The hook cannot be sprung or opened when casting the same or in pulling it by ordinary movements through the water.

In releasing the hook-terimnals from the mouth of the fish after landing the latter a very simple operation is pursued, it being understood that one terminal be first disengaged and then the other, and following this disengagement of the hook-terminals from the mouth of the fish the hook as an entirety may be afterward quickly reset and baited for further similar use.

By forming the improved hook of one piece of material throughout a considerable economy in the cost of manufacture results and a rapidity of formation may be pursued either by machinery or otherwise, and though the improved hook is formed of spring material it will have such tenacity as to resist breakage thereof under ordinary circumstances.

Having thus described the invention, what is claimed is—

1. A fish-hook having shanks with hook-terminals normally held apart by intermediate resilient means with which said shanks are continuous, one shank having an angular locking projection integral therewith to engage the opposite shank, the locking projection being located close to one of the hook-terminals to permit a close assemblage of the shanks, and the hook-terminals having barbed extremities.

2. A hook of the class set forth having shanks normally sprung outwardly from each other, one of the shanks having an angular locking projection to extend across the other shank when both shanks are drawn into close relation, and hook-terminals with laterally-deflected barbed extremities which extend inwardly in reverse directions when the shanks are brought together and locked, the hook-shanks having seat-bends reversely arranged and continuing into the hook-terminals.

3. A spring-hook having shanks with hook-terminals, one of the shanks having an angular locking projection forming a part thereof to extend across and engage a portion of the opposite shank without surrounding or intertwisting with the latter to hold the hook-terminals in operative juxtaposition.

4. A hook of the class set forth, having normally separated spring-shanks with hook-terminals, the shanks adjacent to the terminals being reversely struck out to form seats to permit the said shanks to be drawn closely together to set the hook-terminals in close position to hold a bait thereon, one of the shanks close to its seat-bend having an angular locking projection to extend across the other shank above the position of both seat-bends of the two shanks.

5. A hook of the class set forth, having normally separated resilient shanks carrying hook-terminals with reversely-deflected barbed extremities, the one shank having a looped locking projection forming a part thereof and disposed at an angle to engage the other shank to hold the hook-terminals in juxtaposition when set, the locking projection extending across but not surrounding or intertwisting the shank with which it engages, the shanks and terminals being released to spring apart by a pressure exerted on the barbed extremities in a direction transversely with respect to the hook-terminals.

In testimony whereof I have hereunto set my hand in presence of two subscribing witnesses.

DANIEL E. ROBINSON.

Witnesses:
 M. A. BROADFOOT,
 FLORENCE B. BROADFOOT.